United States Patent [19]

Mathews

[11] Patent Number: 4,905,800
[45] Date of Patent: Mar. 6, 1990

[54] S-CAM FOR DRUM BRAKE

[75] Inventor: George P. Mathews, Portage, Mich.

[73] Assignee: Eaton Corporation, Cleveland, Ohio

[21] Appl. No.: 903,622

[22] Filed: Sep. 5, 1986

[51] Int. Cl.$^4$ .............................................. F16D 51/22
[52] U.S. Cl. ..................................... 188/329; 74/567;
188/1.11; 192/93 R
[58] Field of Search ............... 188/329, 330, 332, 338,
188/339, 324–325, 343, 1.11, 72.7; 192/93 R,
78; 74/567

[56] References Cited

U.S. PATENT DOCUMENTS

| | | | |
|---|---|---|---|
| 2,369,259 | 2/1945 | Simpkins et al. | 188/205 R |
| 2,710,076 | 6/1955 | Russell | 188/78 |
| 3,096,856 | 7/1963 | Burnett | 188/78 |
| 3,398,814 | 8/1968 | Deibel | 188/78 |
| 3,952,843 | 4/1976 | Campbell et al. | 188/72.7 X |
| 4,260,042 | 4/1981 | Szalai et al. | 188/330 |

FOREIGN PATENT DOCUMENTS

| | | | |
|---|---|---|---|
| 1215012 | 4/1966 | Fed. Rep. of Germany | 188/72.7 |
| 2653320 | 1/1978 | Fed. Rep. of Germany | 188/72.7 |

Primary Examiner—George E. A. Halvosa
Attorney, Agent, or Firm—H. D. Gordon

[57] ABSTRACT

An improved S-cam (100) for expanding internal shoe (20) drum brakes (10) is provided. The working surfaces (116) of the S-cam are provided at their ends with an extremely high rise/low mechanical advantage portion (122) providing a warning ramp to indicate to the operator that brake relining is required and to minimize the possibility of cam flip.

10 Claims, 3 Drawing Sheets

S-CAM FOR DRUM BRAKE

BACKGROUND OF THE INVENTION

1. Field of the Invention

The present invention relates to rotary S-cam expanding internal shoe drum brakes and, in particular, to an improved S-cam for expanding internal shoe drum brakes.

2. Description of the Prior Art

S-cam expanding internal shoe drum brakes are well known in the prior art as may be seen by reference to U.S. Pat. Nos. 2,369,259; 2,710,076; 3,096,856; 3,275,103; 3,398,814; 4,206,834; 4,260,042; 4,526,254 and 4,552,254, the disclosures of which are hereby incorporated by reference.

While the prior art S-cam drum brakes are commercially successful, the prior art S-cam drum brakes are continually subject to improvement as increased wear between relinings, improved indication to the vehicle operator of the necessity for relining, increased resistance to cam flip and/or improved compatibility among different brands of brakes are desirable.

SUMMARY OF THE INVENTION

In accordance with the present invention, the performance of the prior art S-cam drum brakes is advanced by the provision of an improved S-cam which allows greater lining wear between brake relinings, provides improved indication to the vehicle operator that relining is required, further minimizes the possibility of cam flip or cam rollover and promotes increased compatibility among different brands of brakes.

The above is accomplished by providing an S-cam having a working surface for engagement with the brake shoe cam followers which is comprised of three sections. A first section engages the cam follower in the nonrotationally displaced condition of the cam, generally conforms to the profile of the cam follower, usually a roller, and provides high lift. This allows minimal expansion of the shoes in the fully radially retracted position allowing the use of thicker linings and also requires a minimal use of the available S-cam rotation for slack take-up. The second section extends from the first section and comprises almost all of the remaining usable working surface and is defined, in cross-section, by a substantially involute spiral to provide most acceptable brake operation.

The third section of working surface extends from the second section and extends sharply radially outwardly therefrom to define an extremely high rise, and thus low mechanical advantage area of working surface. The low mechanical advantage and high rise provides a detectable increase in required braking effort to warn the operator that brake relining is required, allows more shoe lining to be utilized, and is less likely to cause sufficient wear of linings, drums and/or shoes for cam rollover or flip.

Accordingly, it is an object of the present invention to provide a new and improved S-cam rotary actuator for expanding internal shoe drum brakes.

This and other objects and advantages of the present invention will become apparent from a reading of the detailed description of the preferred embodiment taken in connection with the attached drawings.

DESCRIPTION OF THE PREFERRED EMBODIMENT

Figure 1:
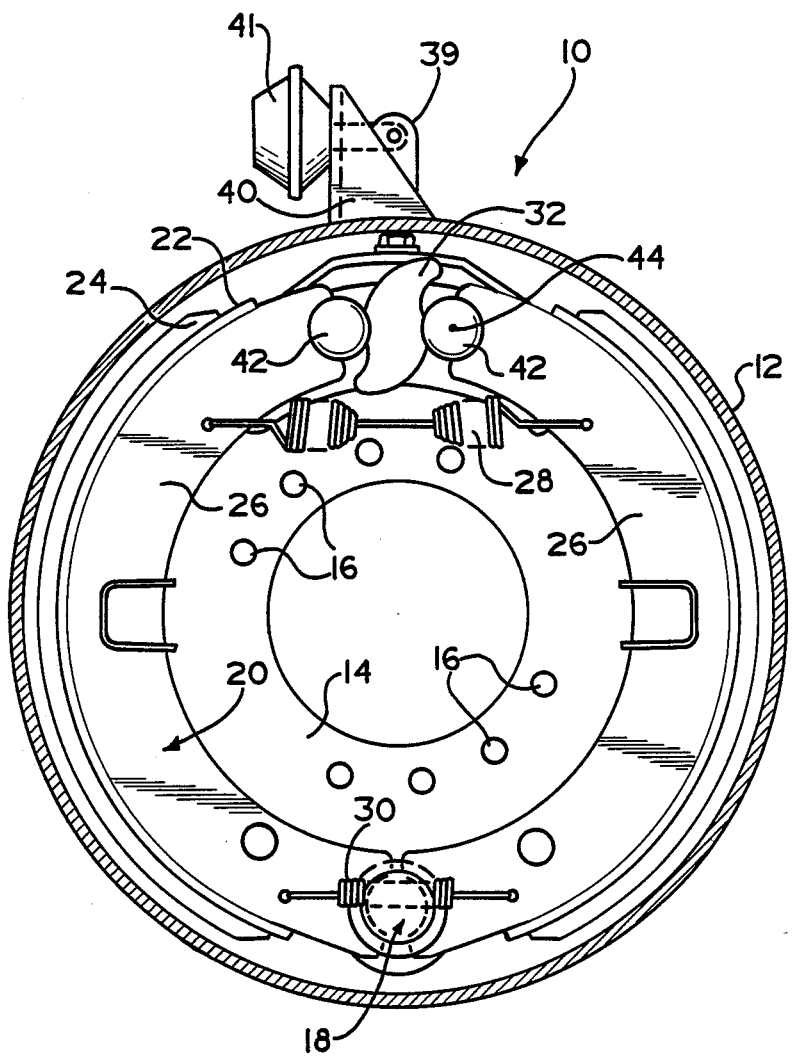
FIG. 1 is a plan view of the outboard side of a prior art S-cam expanding internal shoe drum brake.

Certain terminology will be used in the following description for convenience in reference only and will not be limiting. The words "upwardly", "downwardly", "rightwardly", "leftwardly", "clockwise" and "counterclockwise" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import. The term "brakes" as used herein is intended to include various frictional coupling devices such as clutches, brakes and the like.

A typical prior art S-cam type expanding shoe drum brake assembly 10 is illustrated in FIG. 1. Drum brake assembly 10 comprises a generally rotatable drum 12 (shown in section), a brake support member or spider member 14 nonrotatably secured to portions of the vehicle by a plurality of suitable fasteners such as bolts or the like (not shown) receivable through bolt circle holes 16, a brake shoe pivot or anchor pin 18 secured to the spider 14, a pair of opposed, generally arcuate, brake shoes 20 including a brake lining support or table 22, a brake lining 24 of suitable friction material,,and webs 26, brake shoe return spring 28, brake shoe retaining spring 30, and an S-cam element 32 for causing generally radially outward pivotal movement of the brake shoes 20 and brake linings 24 about the pivot or anchor pin 18 and into frictional engagement with the brake drum 12 for retarding movement of the vehicle in a known manner.

Cam 32 is nonrotationally fixed to or integral with a cam shaft (not shown). The cam shaft is mounted for rotation with the brake actuator lever member 39 such as the lever body of an automatic or manual slack adjuster as is well known in the prior art. A brake actuator support bracket 40 is fixedly mounted to the brake spider 14 for mounting a brake actuator 41 such as an air motor or the like. As is well known in the art, oscillatory motion of the actuator air motor is transmitted to the cam 32 by means of the lever body of the slack adjuster and the cam shaft. The general structure and operation of cam actuated expanding shoe drum brakes, slack adjusters and actuators described briefly above is well known in the art, and may be appreciated in further detail by reference to U. S. Pat. Nos.3,497,037; 3,096,857; and 3,507,369, the disclosures of all of which are hereby incorporated by reference.

Cam followers 42, preferably in the form of rollers, are rotationally mounted to the ends of the brake shoe webs 26 and bear against the periphery of the working surfaces of the cam 32 under the bias of compression return springs 28. Counterclockwise rotation of cam 32 from the position illustrated in FIG. 1 will result in the cam followers 42 and the brake shoes being forced radially outwardly resulting in the generally arcuate brake shoes 20 pivoting radially outwardly about anchor pin 18 sufficiently to cause brake friction material 24 to frictionally engage brake drum 12. A subsequent clockwise rotation of cam 32 will cause the brake shoes to pivot radially inwardly to the brake release position illustrated in FIG. 1.

Figure 2:
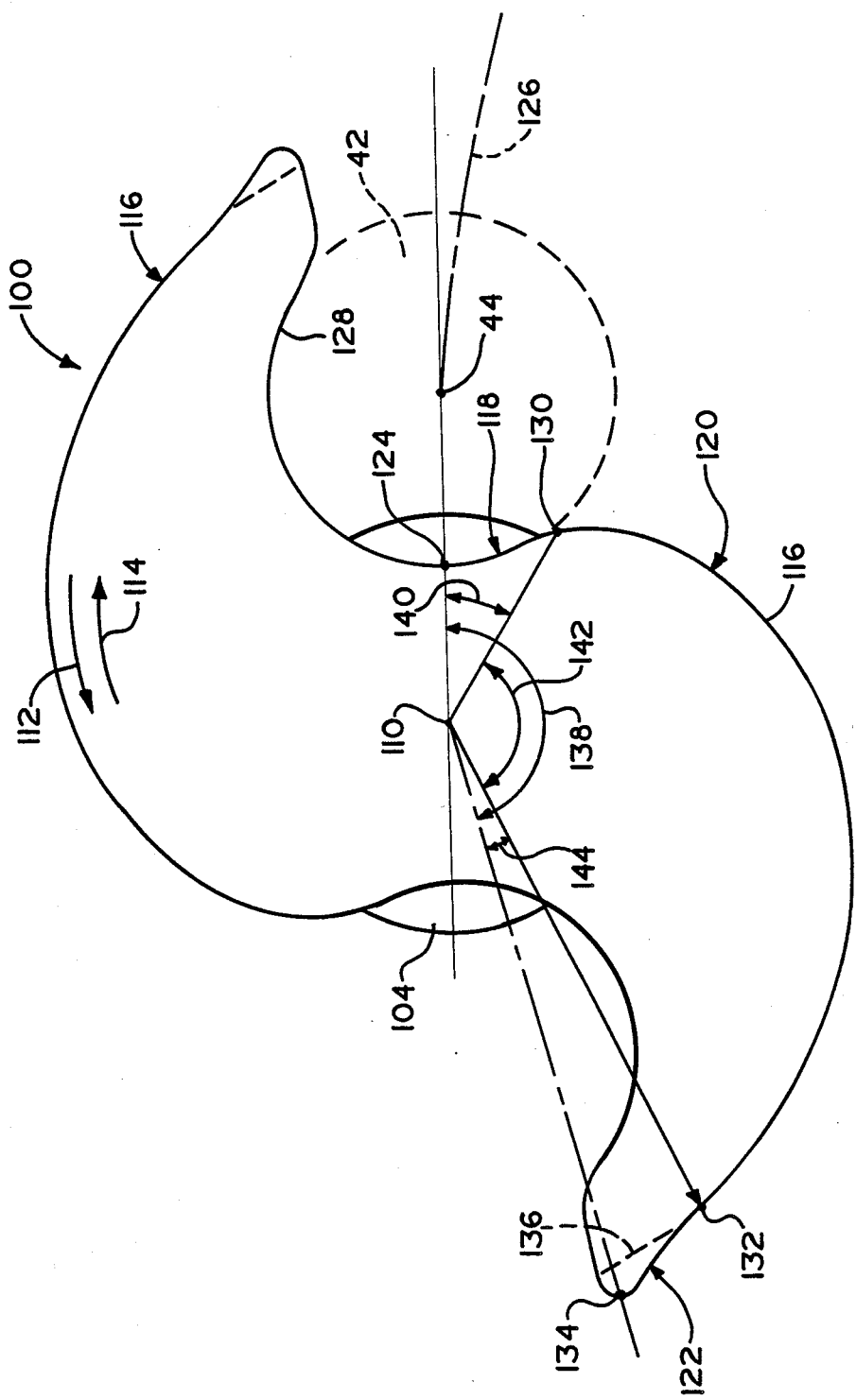
FIG. 2 is an enlarged front view of the S-cam of the present invention.
Figure 3:
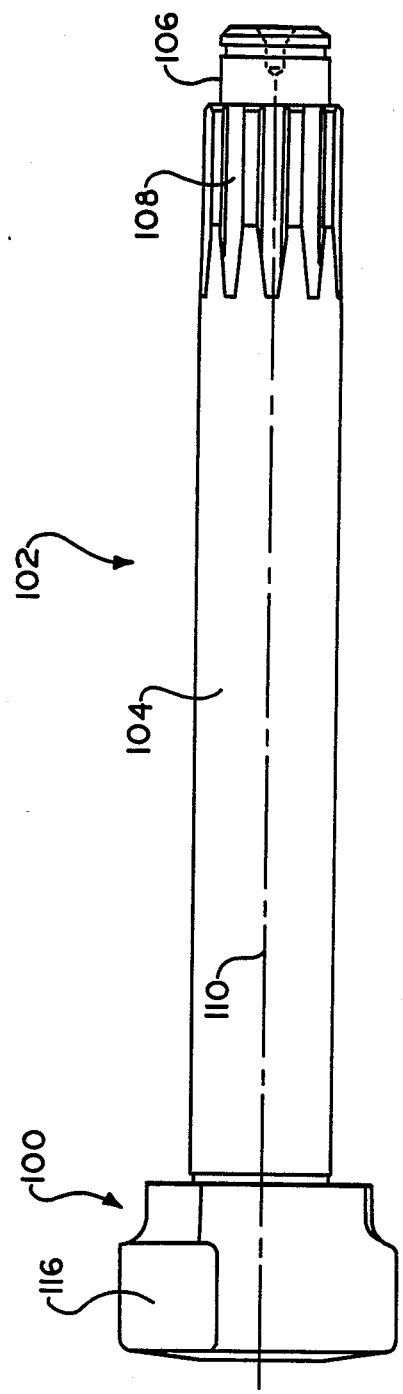
FIG. 3 is a side view of the S-cam of the present invention.

The S-cam 100 and the S-cam shaft assembly 102 of the present invention may be seen by reference to FIGS. 2 and 3, respectively. Referring to FIG. 3, the S-cam shaft assembly 102 includes a cam-shaft member 104 and the S-cam 100 which may be nonrotationally fixed thereto for integral therewith. The inboard end 106 of the cam shaft 104 is provided with splines 108 or the like to nonrotationally fix the cam shaft assembly 102 to actuator lever 39 for rotating same about cam axis 110. With proper dimensioning, the S-cam of the present invention 100 may be directly substituted for prior art S-cam 32 for use in a S-cam type expanding shoe drum brake assembly such as drum brake assembly 10 illustrated in FIG. 1.

When utilized in an expanding shoe drum brake assembly such as assembly 10, S-cam 100 may be rotated in the counterclockwise direction as indicated by arrow 112 to expand the brake shoes radially outwardly to engage the brake assembly 10 or may be rotated in the clockwise direction as indicated by arrow 114 to cause the brake shoes to radially retract into the disengaged condition of brake assembly 10. The S-cam 100 defines a pair of working surfaces 116 which are substantially inverse mirror images of one another as is well known in the prior art. Each of the working surfaces 116 preferably comprises three portions or sections 118, 120 and 122, which will be described in greater detail below.

A roller type cam follower is shown in phantom lines in FIG. 2 in the fully clockwise rotated position, or fully disengaged position, of S-cam 110. Point 124 designates the point of contact between working surface 116 and roller follower 42. As the cam 100 is rotated in the counterclockwise direction, the rotational axis 44 of roller follower 42 will pivot radially outwardly along line 126 about the pivot axis 18. It is noted that the portion 128 of the S-cam located generally upwardly from point 124 conforms generally to the outer periphery of the roller 42, thus allowing full radial inward retraction of the brake shoes which permits a radially thicker brake lining 24 to be utilized and still allow the brake drum to be assembled thereover. The rise or rate of lift of a cam may be defined as the change in distance from the working surface 116 to the rotational axis 110 of the cam for a given amount of rotation. As is known, the greater the rise or rate of lift of a cam, the lower the mechanical advantage thereof.

The first section 118 of the cam working surface 116 extends from point 124 to point 130 and is of a relatively high rise. The purpose of portion 118 of the working surface is to bring the friction lining 124 into, or almost into, frictional engagement with brake drum 12 (i.e. to take up the slack therebetween) but not to apply a friction engagement force therebetween, utilizing as little as possible of the available rotational movement of cam 100. As a practical matter, in view of the necessary cam roller follower dimensions and manufacturing requirements, only about 160° of effective surface area is available for each of the cam working surfaces 116. Accordingly, it is important that portion 118 bring the linings quickly into approximate contact with the brake drum and, as this radially outward movement of the brake shoes is not wearing friction lining nor braking the vehicle, a rapid rise or lift rate is desirable while a great mechanical advantage is not required.

The second section 120 of the working surface 116 extends from point 130 to point 132 and comprises a substantial portion of the total available working surface 116. Section 120 consists substantially entirely of an involute spiral in cross-section having a moderate, substantially constant lift rate. During operation of the cam 100 with the point of contact between the follower 42 and the cam surface 116 occurring in the second portion 120 of the working surface, brake lining is worn and braking torque is produced at a fixed, design selected cam force mechanical advantage. The cross-sectional profile of the second portion 120 of the working surface is selected such that the mechanical advantage of the cam during contact of the follower 42 with the second portion 120 is substantially constant. Additionally, the mechanical advantage of the cam during operation on the second portion 120 of the working surface 116 is preferably substantially equal to the mechanical advantage of other S-cam brakes to provide greater compatibility between S-cam brakes of different brands.

The third section 122 of the working surface 116 extends from point 132 to point 134 and is generally defined by a straight line ramp extending radially outwardly at a much greater rate than the involute spiral defining portion 120. For comparative purposes only, dotted line 136 represents the continuation of the involute spiral form defining portion 120. As third portion 122 had a considerably greater rate of lift than second portion 120, it also provides a considerably reduced force multiplication of the torque applied to rotate cam 100. This reduced force multiplication, or decreased mechanical advantage, is noticeable to the vehicle operator and thus third portion 122 acts as a "warning ramp" to indicate to the operator that the vehicle brakes need to be relined. Additionally, the high rise permits a greater amount of the friction material 24 to be utilized and the decreased mechanical advantage minimizes the possibility of the brake linings, brake shoe and/or brake drum wearing to the extent that cam rollover or cam flip can occur.

As stated above, the total available working surface 116 of S-cam 100 extends from point 124 to point 134. The angle 138, (i.e. angle 124-110-134) equals about 160° to 165°. The first portion 118 of the working surface 116 extends from point 124 to point 130. Angle 140 (i.e. angle 124-110-130) equals about 28° to 30°. The second working portion 120 of working surface 116, extends from point 130 to point 132. The angle 142 (i.e. angle 130-110-132) equals about 124° to 126°. The third portion 122 of working surface 116 extends from point 132 to point 134. Angle 142 (i.e. angle 132-110-134) equals about 10°.

It is important to note, that the average rate of lift of portion 122 of the working surface is at least two times greater than the rate of lift of the portion 120 of the working surface 116 to provide the beneficial different performance characteristics therebetween.

Although only one preferred embodiment of the present invention has been illustrated for purposes of example, it will appreciated that those skilled in the art can make modifications and revisions to the invention as to suit individual requirements. It is intended, therefor, that such revisions and variations as incorporate the herein disclosed principals of the invention will be included within the scope of the following claims as equivalents to the present invention.

I claim:

1. An S-cam member (100) for expanding internal shoe brakes (10) of the type comprising a pair of pivotably mounted brake shoes (20) located interiorly of a brake drum (12), each of said brake shoes carrying a cam follower (42) urged into engagement with a cam member working surface (116), rotation of said cam member in a first direction of rotation (112) from the fully disengaged condition of said brake forcing said brake shoes radially outwardly relative to said brake drum and rotation in the opposite direction of rotation (114) causing radial return of said brake shoes relative to said brake drum, each of said working surfaces comprising a first portion (118) engaged by said followers in the fully disengaged condition of said S-cam member and a second portion (120) extending from said first portion in substantially said opposite direction of rotation, said second portion of a substantially involute spiral shape in cross-section to provide a substantially constant first rate of lift, said S-cam characterized by:
 a third portion (122) of each of said working surfaces extending in substantially said opposite direction of rotation from said second portion, said third portion defined by a generally straight radially outwardly extending line in cross-section having a second rate of lift substantially greater than said first rate of lift.

2. The S-cam member of claim 1, wherein said second rate of lift is at least twice as great as said first rate of lift.

3. The S-cam member of claim 2, wherein said first portion defines a third rate of lift substantially greater than said first rate of lift, travel of said cam followers in said first direction of rotation over said first portion effective to bring said shoes, if in a substantially unworn condition, from the fully retracted position into substantially initial contact with said brake drums.

4. The S-cam member of claim 2, wherein said cam follower is a roller member having substantially circular cross-section and a portion of the profile of said first portion of said working surface conforms closely to the outer diameter of said cam follower.

5. The S-cam member of claim 1, wherein said first portion defines a third rate of lift substantially greater than said first rate of lift, travel of said cam followers in said first direction of rotation over said first portion effective to bring said shoes, if in a substantially unworn condition, from the fully retracted position into substantially initial contact with said brake drums.

6. The S-cam member of claim 5, wherein the mechanical advantage of said S-cam when rotating in said first direction of rotation with said follower engaging said second portion of said working surface being substantially greater than the mechanical advantage of said S-cam when rotating in said first direction of rotation with said cam follower engaging said third portion of said working surface.

7. The S-cam member of claim 5, wherein said cam follower is a roller member having substantially circular cross-section and a portion of the profile of said first portion of said working surface conforms closely to the outer diameter of said cam follower.

8. The S-cam member of claim 1, wherein the mechanical advantage of said S-cam when rotating in said first direction of rotation with said follower engaging said second portion of said working surface being substantially greater than the mechanical advantage of said S-cam when rotating in said first direction of rotation with said cam follower engaging said third portion of said working surface.

9. The S-cam member of claim 8, wherein said cam follower is a roller member having substantially circular cross-section and a portion of the profile of said first portion of said working surface conforms closely to the outer diameter of said cam follower.

10. The S-cam member of claim 1, wherein said cam follower is a roller member having substantially circular cross-section and a portion of the profile of said first portion of said working surface conforms closely to the outer diameter of said cam follower.

* * * * *